Oct. 1, 1935.  D. F. LINSLEY  2,015,719
BRAKE
Filed May 21, 1930
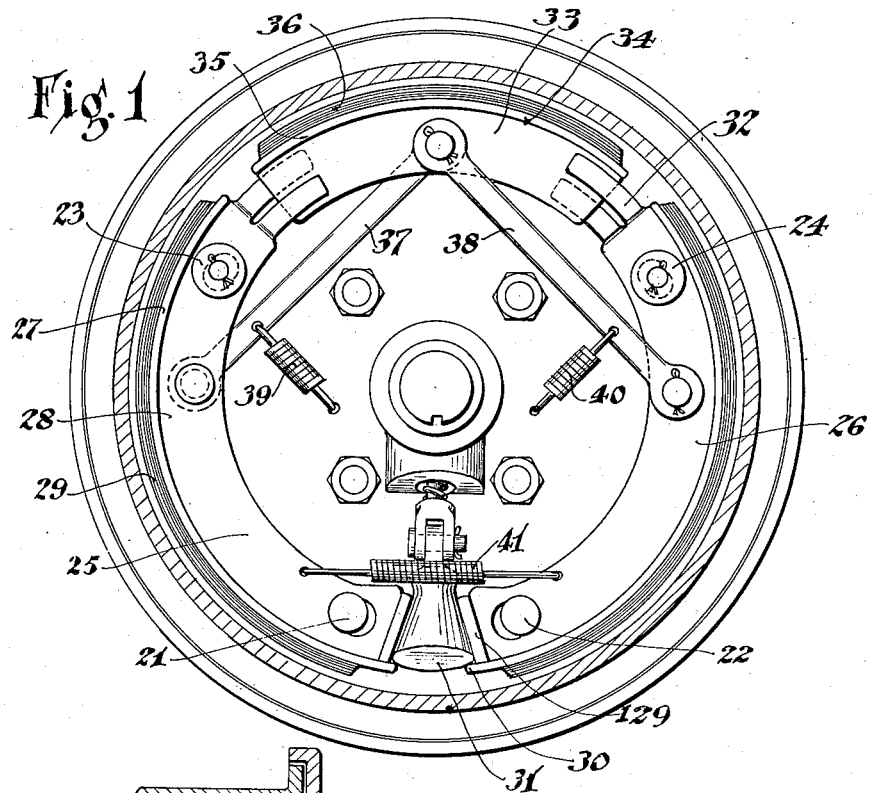

Patented Oct. 1, 1935

2,015,719

UNITED STATES PATENT OFFICE 2,015,719

BRAKE

Douglas Fowler Linsley, Sound Beach, Conn., assignor to Bendix Brake Company, South Bend, Ind., a corporation of Illinois Application May 21, 1930, Serial No. 454,226

8 Claims. (Cl. 188—78)

This invention relates to brakes and more particularly to internal expanding brakes.

An object of the invention is to provide a simple and effective actuating means for the friction elements of a brake.

Another object of the invention is to provide a means supported by the pivot pin of a steering head, wherein the applied force for actuating the friction elements of the brake may be directed in a plane substantially coinciding with the plane of application of the friction elements.

A further object of the invention is to provide means for actuating the friction elements of the brake wherein the operating means extends axially through the pivot pin in the steering head.

A further object of the invention is to provide an actuating means for a plurality of friction elements so arranged that the friction elements and actuating means therefor may be completely housed.

A feature of the invention is a hollow steering pivot pin having an operating cable extending through the pin and suitably secured to a member adapted to spread the shoes for engagement with the drum.

Another feature of the invention is the particular relation of the respective friction elements to each other.

A further feature of the invention is the particular structure of the friction elements.

Other objects and features of the invention will appear from the following description taken in connection with the drawing, which forms a part of this specification, and in which:

Figure 1 is a side elevation of a brake embodying the invention, the drum being shown in section; and Figure 2 is a side elevation of a front axle of a motor vehicle having a steering head on which is swivelled a knuckle supporting a brake mechanism, the steering head and the brake being shown in section.

Referring to the drawing for more specific details of the invention, 10 represents the front axle of a motor vehicle having formed thereon a steering head 11. The head is bored, as indicated at 12, to receive a steering pivot pin 13 upon which is swivelled a knuckle 14 supporting a spindle 15. As shown, the pivot pin is axially bored, as at 16, and the bore is threaded at 17, the object of which will hereinafter appear.

Secured on the knuckle 14 is a backing plate 18 swaged as indicated at 19, so that the bore 16 in the pivot pin 12 may open on the inner side of the backing plate. Associated with the backing plate 18 is a drum 20 which may be suitably secured to a wheel, not shown.

Positioned on the backing plate are suitable anchors 21 and 22 and steady rests 23 and 24. As shown, corresponding brake shoes 25 and 26 are positioned on the anchor 21 and steady rest 23 and anchor 22 and steady rest 24 respectively. These shoes are of a conventional type each having a rim 27, a web 28 and a suitable lining 29 secured to the rim adaptable for engagement with the radius of the drum. These shoes are interchangeable. As shown, their shouldered ends are provided with thrust plates 129 and the rims extend slightly beyond the thrust plates, as at 30, to provide an adequate seat for a cone or conical shaped actuating member 31 to be hereinafter referred to.

The other ends of the shoes are bifurcated, as indicated at 32, and the bifurcated portions are offset in opposite directions to engage the web 33 of a servo shoe 34, the rim 35 of which supports a lining 36 adapted to engage the drum. The servo shoe is pivotally connected substantially centrally between its respective ends to arms or rods 37 and 38 which are respectively pivoted to the shoes 25 and 26 preferably midway of the centers and the toes of the shoes.

Connecting the arms 37 and 38 to the backing plate are coil springs 39 and 40 and connecting the shoes 25 and 26 is a coil spring 41. These springs serve to return the shoes to the off position and to retain them when in the off position in proper spaced relation to the drum.

As shown, a nut 42 is threaded in the upper end of the pivot pin and suitably secured in a recess of this nut is a sheath 43 of an operating cable 44. The operating cable extends through the pivot pin and has secured on the end thereof a clevis 45 pivoted to the cone or conical shaped actuating member 31 as by a bolt 46 and positioned on the cable intermediate the clevis and the nut is a coil spring 47 tending to force the actuating member 31 against the seat 30 on the rim of the respective friction elements.

In operation, a pull is placed on the operating cable 44. This force compresses the spring 47 and wedges the member 31 between the thrust plates 29 on the respective shoulders of the shoes 25 and 26 causing the shoes to move apart and to engage the radius of the drum. This movement of the shoes 25 and 26 is transmitted through the rods 37 and 38 to the servo shoe 34 and this applied force, assisted by the whipping action of the drum, imparting a slight centrifugal movement of the servo shoe more effectively applies the shoes 25 and 26 by reason of their connections with the servo shoe.

Although this invention has been described in connection with certain specific embodiments, the principles involved are susceptible of numerous other applications that will readily occur to persons skilled in the art. The invention is, therefore, to be limited only by the scope of the appended claims. The above-described brake-applying mechanism is claimed in my divisional application No. 750,267, filed October 27, 1934.

Having thus described the various features of the invention, what I claim as new and desire to secure by Letters Patent is:

1. A brake comprising two corresponding shoes positioned for movement thereon, a servo shoe positioned between and held in position by the ends of the shoes, and a pair of rods each pivoted to one of the first named shoes and each pivoted to the servo shoe.

2. A brake comprising a support, corresponding shoes positioned for movement thereon, a servo shoe positioned between the ends of the shoes and means comprising a pair of links each pivotally connected at one end to the servo shoe and at the other end to one of the corresponding shoes for connecting the servo shoe to the respective corresponding shoes.

3. A brake comprising a support, corresponding shoes positioned for movement on the support and selectively anchored at their separable ends, a servo shoe positioned between the other ends of the shoes and means connecting the servo shoe to the respective corresponding shoes for uniformly actuating the shoes.

4. A brake comprising a fixed support, a drum associated therewith, corresponding friction elements positioned for movement on the support and selectively anchored at their separable ends, a servo shoe positioned between their other ends, rods pivotally secured to the servo shoe and to the respective corresponding shoes for pivotally connecting the servo shoe to the respective corresponding shoes and means for spreading the shoes for engagement with the drum.

5. A brake comprising a fixed support, a drum associated therewith, corresponding shoes movably positioned on the support and selectively anchored at their separable ends, a servo shoe positioned between the other ends of the corresponding shoes, means on the corresponding shoes for alining the servo shoe, rods connecting the servo shoe to the respective corresponding shoes and means for spreading the shoes including a conical member positioned between the shoulders of the shoes.

6. A brake comprising a fixed support, a rotatable drum associated therewith, corresponding shoes positioned for movement on the support selectively anchored at their separable ends, a servo shoe positioned between the other ends of the corresponding shoes, means on the corresponding shoes for confining the servo shoe against lateral movement, rods connecting the servo shoe to the respective corresponding shoes, return springs connecting the rods to the fixed support and means for spreading the shoes including a conical member and an operating cable therefor.

7. A brake comprising a fixed support, a rotatable drum associated therewith, corresponding shoes positioned on the drum and selectively anchored at their separable ends, a servo shoe positioned between the other ends of the corresponding shoes, means on the corresponding shoes for retaining the servo shoe against lateral movement, rods pivotally connected to the servo shoe centrally between the respective ends thereof and to the respective corresponding shoes in spaced relation on one end thereof, springs connecting the rods to the fixed support, an actuating member positioned between the shoulders of the shoes and an operating cable connected to the actuating member.

8. A brake comprising two corresponding shoes positioned for movement thereon and each having a web split to form two oppositely-offset tongues forming a bifurcated end, and a servo shoe positioned between the bifurcated ends of the shoes.

DOUGLAS FOWLER LINSLEY.